Dec. 29, 1925.

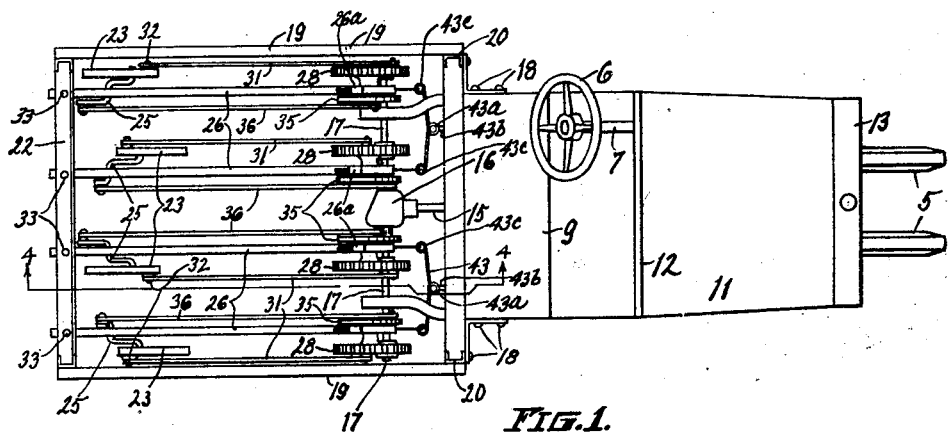

J. SRAKULA

WALKING VEHICLE

Filed Oct. 18, 1924    2 Sheets-Sheet 2

1,567,684

INVENTOR.
Joseph Srakula
BY David E. Carlsen
ATTORNEY

Patented Dec. 29, 1925.

1,567,684

UNITED STATES PATENT OFFICE.

JOSEPH SRAKULA, OF SOUTH ST. PAUL, MINNESOTA.

WALKING VEHICLE.

Application filed October 18, 1924. Serial No. 744,400.

*To all whom it may concern:*

Be it known that I, JOSEPH SRAKULA, a citizen of the Republic of Poland, residing at South St. Paul, in the county of Dakota and State of Minnesota, have invented certain new and useful Improvements in Walking Vehicles, of which the following is a specification.

My invention relates to motor driven vehicles of a type in which the propelling means comprise a walking mechanism instead of drive wheels. The object is to provide a vehicle particularly useful for transportation, traction or towing on rough, uneven or soft surfaced roads and ground where wheel driven vehicles are inefficient for lack of sufficient ground contact and other obvious reasons.

In the accompanying drawings:

Fig. 1 is a top view of my improved vehicle with some minor parts omitted.

Fig. 2 is a right side elevation of Fig. 1 with a wagon body and some other parts added.

Figure 4:
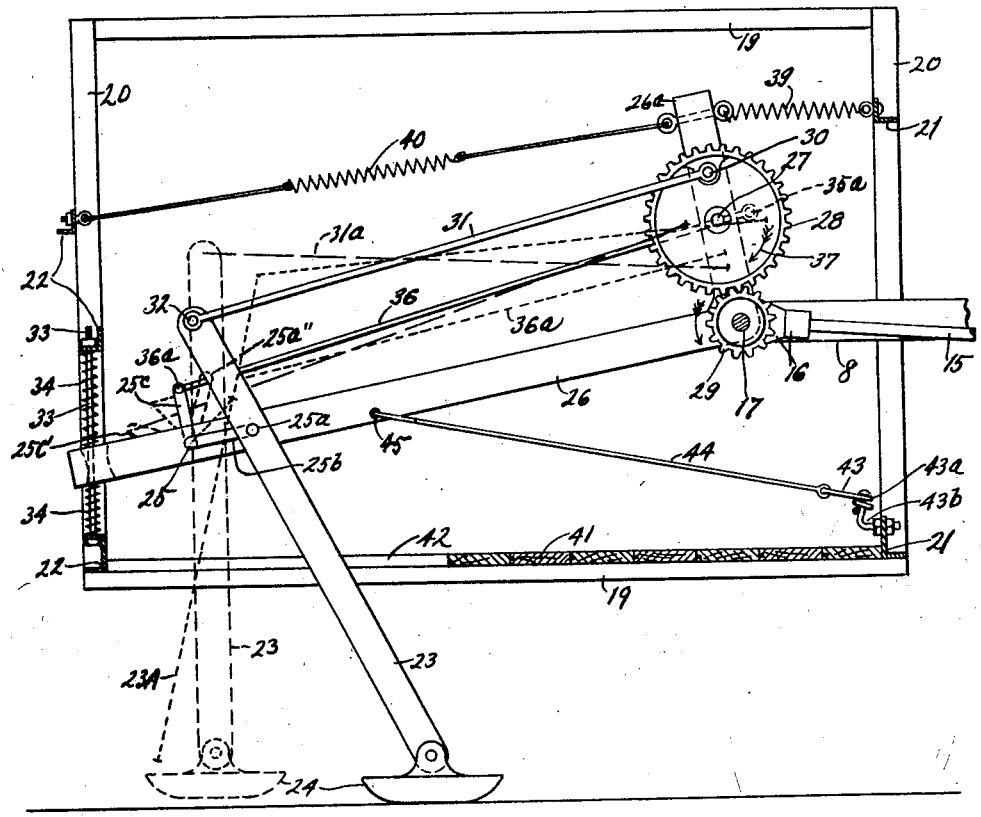
Fig. 4 is an enlarged sectional elevation about as on line 4—4 in Fig. 1 and showing mainly the various positions of one leg or tread bar of my device.
Figure 3:
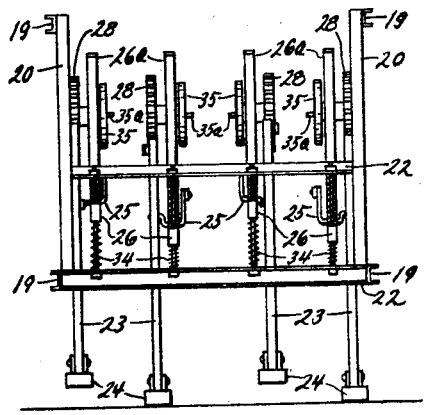
Fig. 3 is a rear elevation of the vehicle in which the wagon body is omitted as also some of the forward parts of the vehicle.

Referring to the drawings by reference numerals 5 designates any suitable type of steering wheels turned by a hand wheel 6 on a steering column 7 and supporting the front end of a motor vehicle frame 8 preferably comprising two longitudinal channels terminating back of the driver's seat 9. 10, in Fig. 2, is the motor or other power unit mounted in the frame and covered by a hood 11 extending from the dashboard 12 and forward to the radiator 13. 10ᵃ is the usual transmission housing back of the motor and from which projects rearwardly a shaft 14 (Fig. 2) to a universal joint 14ᵃ driving another shaft 15, known as the main drive shaft on motor vehicles, extending rearwardly for driving suitable bevel gears (not shown) within a housing 16 for rotating a transverse drive shaft 17 journaled in the rear ends of the frame members 8.

The walking mechanism is all mounted within an elongated skeleton frame the forward end of which is secured as at 18 on the rear part of the frame members 8. Said skeleton frame comprises a quadrangular upright frame with horizontal members 19 and vertical members 20, one such frame to each frame member 8, and both frames connected by horizontal front and rear cross bars 21 and 22 respectively.

The propelling means contacting with the ground comprises a series of legs 23 oscillable in a vertical plane and longitudinally of the vehicle. Each leg has a shoe 24 pivotally suspended from its lower end. Each leg is also pivotally suspended or fulcrumed, as at 25ᵃ Fig. 4, on the front end of an arm 25ᵇ of a bell crank lever 25 having another arm 25ᶜ normally projecting upwardly and the lever itself is pivotally secured in the rear part of a vertically reciprocable L-shaped rocker bar 26 the front part of which is journaled on the shaft 17 and the short arm 26ᵃ of the bar projecting upwardly from said shaft 17. Each arm 26ᵃ has a transverse horizontally arranged shaft 27 on which is secured a gear 28 meshing with and driven by a pinion 29 secured on the drive shaft 17. Each gear 28 is provided with a crank pin 30 on which is pivotally secured the forward end of a connecting rod 31 the rear end of which is pivotally secured at 32 to the upper end of leg member 23. The rear end of each bar 26 is guided vertically on a bar 33 fixed in two of the vertically spaced frame bars 22 (see Fig. 4) a compression coil spring 34 being placed about each bar 33 one above and one below bar 26 for cushioning or absorbing shock to said bar 26 for a purpose presently to be described.

Each shaft 27ᵃ projects beyond bar 26ᵃ on the side opposite gear 28 and is there provided a crank disc 35 with a crank pin 35ᵃ on which is pivotally secured the front end of another connecting rod 36 the rear end of which is pivotally connected as at 36ᵃ to the upper end of the arm 25ᶜ of bell crank lever 25 (see Figs. 1, 2 and 4).

For the forward propulsion of my device the power transmitted from the main drive shaft 15 and gears within housing 16 is such that each pinion 29 rotates its gear 28 in the direction indicated by arrow 37 (Figs. 2 and 4). The forward end of each connecting rod 36 is pivoted to rotate about 90 degrees ahead of the rotation of connecting rod 31 on the corresponding gear 28.

I will now describe the propelling of the vehicle as accomplished by one unit or propelling leg after which it will be readily understood that although I have illustrated only four such units any other number of them may be used and one or more units do the actual propelling while other units are idle but moving into operative position. The operation of each leg or tread-bar 23 simulates the walking movement of a human leg, the forward position when the ground contact takes place being about as shown in full lines in Fig. 4. At this position of leg 23 the pivot 30 on gear 28 is in its highest position and the forward end of rod 36 is 90 degrees ahead of pivot 30 which is straight ahead of the axle 27; the rear end of connecting rod 36 is now vertically above the fulcrum of lever 25 and arm $25^b$ of the latter extends forward about horizontal to pivot $25^a$ of leg 23. As the gear 28 continues to rotate rod 31 will bring the upper end of bar 23 forward, said bar acting as a lever with fulcrum at $25^a$ forcing the lower end of bar 23 rearwardly to position $23^A$ while shoe 24 is on the ground with the result that the entire vehicle is propelled forward. The positions shown in Fig. 4 are of course only relative, it being understood that shoe 24 does not move on the ground during the rear stroke of leg 23. During the above described movement of leg 23 it is apparent that its fulcrum $25^a$ must rise and fall according to the angle of the leg. Connecting rod 36 pivoted to arm $25^c$ of the crank 25 and having rearward movement caused by its forward end moving downwardly and rearwardly from position $36^A$ to $36^B$ in Fig. 4 causes arm $25^b$ of lever 25 to be raised automatically the proper amount as the leg 23 is moving rearwardly, the leg fulcrum $25^a$ moving to position $25^{a'}$ (Fig. 4). Assuming that position $23^A$ of leg 23 is the end of the traction stroke it is apparent that the leg and its shoe 24 must be raised from contact with the ground and brought forward in elevated position for the next traction stroke. The latter is accomplished as follows.

When rotation of gear 28 has caused the leg 23 to reach its rearmost position $23^A$ the forward end of rod 36 is moved from its front pivot position $35^a$ downwardly until it assumes position $36^a$ causing some rearward tilting of arm $25^c$ of lever 25 and simultaneously the fulcrum $25^a$ is moved upward to some extent. Continued rotation of gear 28 and its corresponding disk 35 causes the front pivot of rod 36 to be rotated rearwardly of the center of the disk until that lever arm $25^c$ is thereby pushed back to position $25^{c'}$ and the arm $25^b$ is moved to about upright position as $25^{a''}$ (Fig. 4). This raising of arm $25^b$ of course causes the leg fulcrum $25^a$ to rise and the leg 23 is raised free of the ground as 23 (dotted in Fig. 4). During this elevating movement the connecting rod 31 having its front end pivoted and rotating on pin 30 and 90 degrees back of the rotating movement of rod 36 the said rod 31 is elevated with the leg to the top position $31^a$ while its pin 30 reaches the lowest position. While the gear rotates the pin 30 is rotated rearwardly and thence upwardly to its original position 30 (Fig. 4) causing that part of leg 23 above the fulcrum $25^a$ to be swung rearwardly with its upper end and of course the lower lever arm of leg 23 is swung forward while fulcrum $25^a$ is raised. The leg is lowered again to original position by the front end of rod 36 being pulled forward as its front pivot rotates forward on the upper half revolution causing lever arm $25^c$ to be raised and arm $25^b$ coming down to full line position in Fig. 4.

When my device encounters bumps or obstructions such as a rock 38 (Fig. 2) or a hollow (not shown) the L-bar 26 affected will move up or down accordingly, the springs 34 on its guiding rod 33 expanding and contracting according to the direction bar 26 moves and the leg movement is not effected, the stroke of the latter being merely raised or lowered in a vertical plane until the obstruction is passed over, after which the springs 34 bring the bar 26 back to its normal position.

39 is a tension coil spring connecting the upper end of rocker bar arm $26^a$ with any suitable fixed part as bar 21 on the front of the skeleton frame and 40 is a like spring between said bar $26^a$ and a rear part (as bar 22) of the skeleton frame. Said two springs counteract each other on a line in a common plane with the L-bar 26—$26^a$ and have stabilizing or cushioning effect on said bar.

41 (see Fig. 4) is a floor in the bottom part of the skeleton frame and having longitudinal openings 42 for movement of the legs 23. 43 are two bow springs each having a coiled center portion $43^a$ about a fixed pin $43^b$ secured in the lower front part of the skeleton frame. The free end of each arm of said spring has an eye $43^c$ (Fig. 1) in which is attached a rod 44 the forward end of which is secured as at 45 (Fig. 4) to an L-bar 26. One of these bow springs thus serves to pull downwardly and forwardly on two bars 26 simultaneously the arms of it being sprung forward before being connected to rod 44. Said bow spring means act as auxiliary stabilizing devices for the bars 26 and help to provide ample traction during the walking motion of the legs 23.

What I claim is:

1. In a motor driven vehicle of the class described a main frame comprising a forward section supported by steering means and carrying the motor, and a rear section comprising a box-like skeleton frame, a series of upright frame supporting legs pivotally mounted within the latter frame section and oscillable in longitudinal direction of the vehicle, ground contacting members on said legs, means operated by the motor and intermediate the motor and said legs for oscillating the latter in ground contacting position when moving in one direction and in non-ground-contacting position while moving in the opposite direction, said pivot of each leg comprising the extremity of one arm of a bell crank lever, the latter lever pivotally mounted in the long arm of a longitudinally arranged L-shaped rocking beam, said beam being pivotally mounted on a transverse shaft operatively connected with the motor, a pinion on said shaft and adjacent each rocking beam, a gear rotatably mounted on the short arm of each rocking beam and meshing with its adjacent pinion, a crank disk rotatable with said gear; means connecting said gear and its disc respectively with the upper end of each leg and the extremity of the bell crank lever opposite the leg fulcrum for oscillating the leg in a vertical plane.

2. In a motor driven vehicle of the class described a main frame comprising a forward section supported by steering means and carrying the motor, and a rear section comprising a box-like skeleton frame, a series of upright frame supporting legs pivotally mounted within the latter frame section and oscillable in longitudinal direction of the vehicle, ground contacting members on said legs, means operated by the motor and intermediate the motor and said legs for oscillating the latter in ground contacting position when moving in one direction and in non-ground-contacting position while moving in the opposite direction, said pivot of each leg comprising the extremity of one arm of a bell crank lever, the latter lever pivotally mounted in the long arm of a longitudinally arranged L-shaped rocking beam, said beam pivotally mounted on a transverse shaft operatively connected with the motor, a pinion on said shaft and adjacent each rocking beam, a gear rotatably mounted on the short arm of each rocking beam and meshing with its adjacent pinion, a crank disc rotatable with said gear; means connecting said gear and its disc respectively with the upper end of each leg and the extremity of the bell crank lever opposite the leg fulcrum for oscillating the leg in a vertical plane, said connecting means comprising a rod connecting the disc and the bell crank and adapted to be reciprocated by the rotary movement of the disc to impart vertical oscillating movement of the bell crank and raise the fulcrum of the leg while the latter is oscillated in one direction, a rod connecting the gear and the upper end of the leg and oscillated by the rotation of the gear to oscillate the entire leg in a vertical plane.

3. The structure specified in claim 1, and means for guiding the rocking beams in a vertical plane and comprising a fixed vertical rod passed through said beam, compression coil springs on said rod and arranged to contact with the upper and lower sides of the beam for stabilizing the latter.

4. The structure specified in claim 1, said latter means adapted also to oscillate the leg fulcrum; and means mounted within the skeleton frame for pulling the main arm of the rocking beam downwardly and forwardly to create a maximum traction of each leg in contact with the ground.

In testimony whereof I affix my signature.

JOSEPH SRAKULA.